United States Patent
Weng et al.

(10) Patent No.: US 9,218,077 B2
(45) Date of Patent: Dec. 22, 2015

(54) TOUCH CONTROL METHOD AND ELECTRONIC SYSTEM UTILIZING THE SAME

(71) Applicant: HON HAI PRECISION INDUSTRY CO., LTD., New Taipei (TW)

(72) Inventors: Cheng-Hao Weng, New Taipei (TW); Deng-Rung Liu, New Taipei (TW); Chi-Chang Lu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 413 days.

(21) Appl. No.: 13/866,029

(22) Filed: Apr. 19, 2013

(65) Prior Publication Data

US 2013/0278520 A1   Oct. 24, 2013

(30) Foreign Application Priority Data

Apr. 20, 2012   (TW) .............................. 101114061 A

(51) Int. Cl.
G06F 3/041      (2006.01)
G06F 3/0488     (2013.01)

(52) U.S. Cl.
CPC .............. *G06F 3/041* (2013.01); *G06F 3/0416* (2013.01); *G06F 3/04883* (2013.01)

(58) Field of Classification Search
CPC .... G06F 3/041; G06F 3/0416; G06F 3/04883
See application file for complete search history.

(56) References Cited

U.S. PATENT DOCUMENTS

2008/0105470 A1 *   5/2008   Van De Ven et al. ...... 178/18.01

* cited by examiner

*Primary Examiner* — Aneeta Yodichkas
(74) *Attorney, Agent, or Firm* — Novak Druce Connolly Bove + Quigg LLP

(57) ABSTRACT

A touch control method is implemented in an electronic system. A calculation of the product of a pressure value and the area over which pressure is applied are included in touch input data packets representing a touch operation, the values of net force associated with the touch input packets are thus obtained. A signal of a short press, if recognized, with a value of net force greater than a net force threshold can be recognized as a signal of a long press, thus simulating an operation of long press and triggering the selection of an object, where the selection of the object would otherwise require a long press operation. The touch control method operates to significantly speed up selection of an object.

13 Claims, 16 Drawing Sheets

# TOUCH CONTROL METHOD AND ELECTRONIC SYSTEM UTILIZING THE SAME

BACKGROUND

1. Technical Field

Embodiments of the present disclosure relate to a computer technologies, and more particularly to a touch control method and an electronic system utilizing the same.

2. Description of Related Art

Smart mobile phones and tablet computers have become increasingly popular. These kinds of mobile devices are typically equipped with a touch device rather than a mouse. Some mouse operations, such as selecting and dragging of icon and/or text, however, are not easy to be replaced by touch operations. Since moving operations, such as swiping or sliding, on capacitive or infrared touch device are typically defined to move screens or menus, a tap or a touch operation that initiates a moving touch operation is usually interpreted as the beginning of a swiping or a sliding action rather than selection of an object that initiates dragging of the object. When a drag operation is utilized to select a group of text, for example, a press down operation is required to select a first part or a first word of the text, then held to select a last word, and the action is released to complete the selection of the text. Alternatively, when a drag operation is utilized to move an icon, a press down operation is required to select the icon, then held and moved to a destination of the icon, and released to complete the move of the icon.

A time threshold is typically required to distinguish between a swipe and a drag operation. A press operation on an object with an operation time greater than the time threshold is referred to as a long press and interpreted as a selection of the object that initiates dragging of the object. A press operation on an object when terminated on the object with a shorter operation time is referred to as a short press and interpreted as a selection of the object that initiates execution of an application represented by the object. A press operation on an object when held and moved to leave the object with an operation time less than the time threshold is interpreted as a beginning of a swipe operation that moves a screen of a smart mobile phone rather than the object.

In some applications, the time threshold utilized to distinguish between a swipe and a drag complicates user operations and affects application fluency. For example, selecting an object in a computer game according to the time threshold may cause loss of opportunities in the game.

DETAILED DESCRIPTION

The disclosure is illustrated by way of example and not by way of limitation in FIGS. 1-5 of the accompanying drawings in which like references indicate similar elements. Various embodiments illustrate different features of the disclosure. It should be noted that references to "an" or "one" embodiment in this disclosure are not necessarily to the same embodiment, and such references can mean "at least one." Descriptions of components in the embodiments are given for the purpose of illustrating rather than limiting.

Embodiments of a touch control method and an electronic system utilizing the same are given as follows, thus providing user friendly and intuitive controls to electronic systems such as smart mobile phones, tablet personal computers, set-top boxes, and smart televisions. The embodiments of this touch control method and an electronic system utilize a short press to simulate a long press.

Figure 1A:
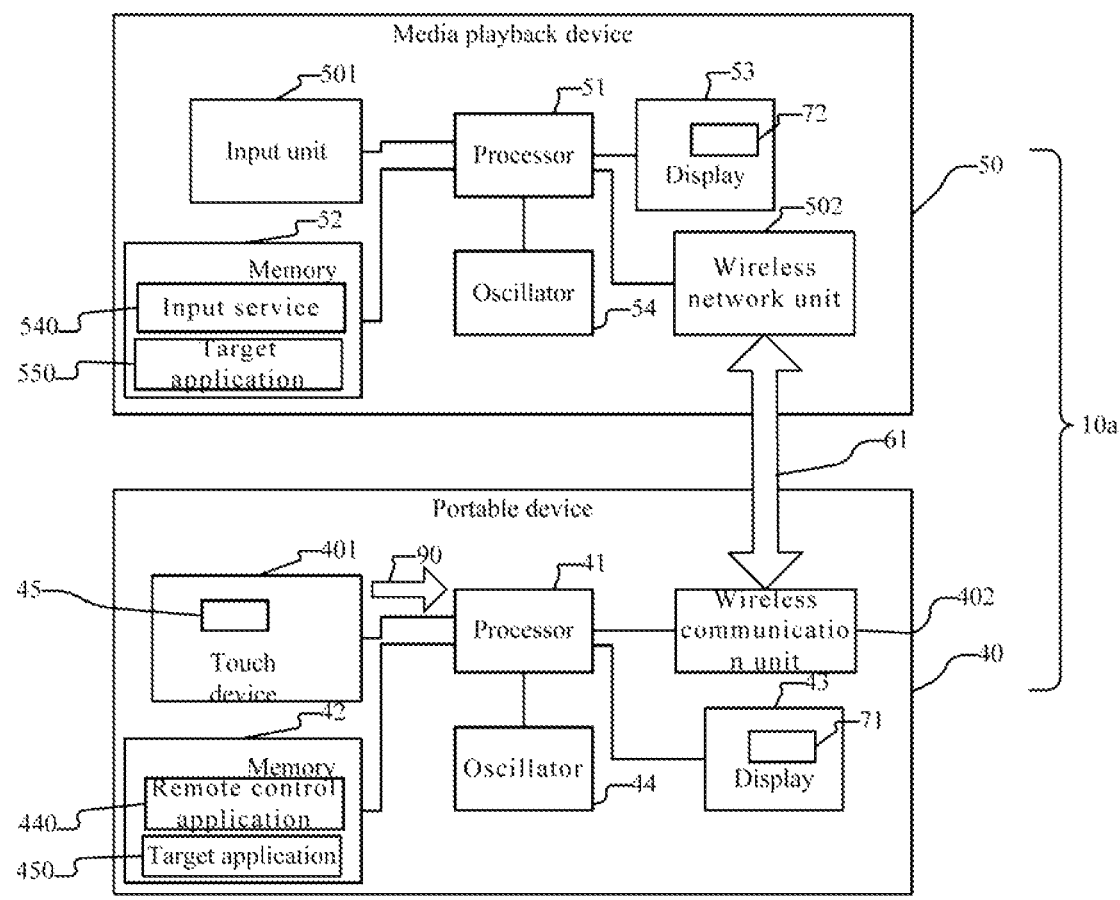
FIG. 1A is a block diagram of one embodiment of an electronic system in accordance with the present disclosure.

With reference to FIG. 1A, an electronic system 10a comprises mobile device 40 and media player device 50. Units and modules in the electronic system 10a may be realized by computer programs or electronic circuits. A processor 41 in the mobile device 40 is in communication with a memory 42, a display 43, a touch device 401, and a wireless communication unit 402. Embodiments of the mobile device 40 may comprise personal digital assistants (PDAs), laptop computers, smart mobile phones or tablet personal computers. The memory 42 in the mobile device 40 may comprise an operating system and applications, such as ANDROID™ operating system and a remote control application 440 and a target application 450.

Figure 1B:
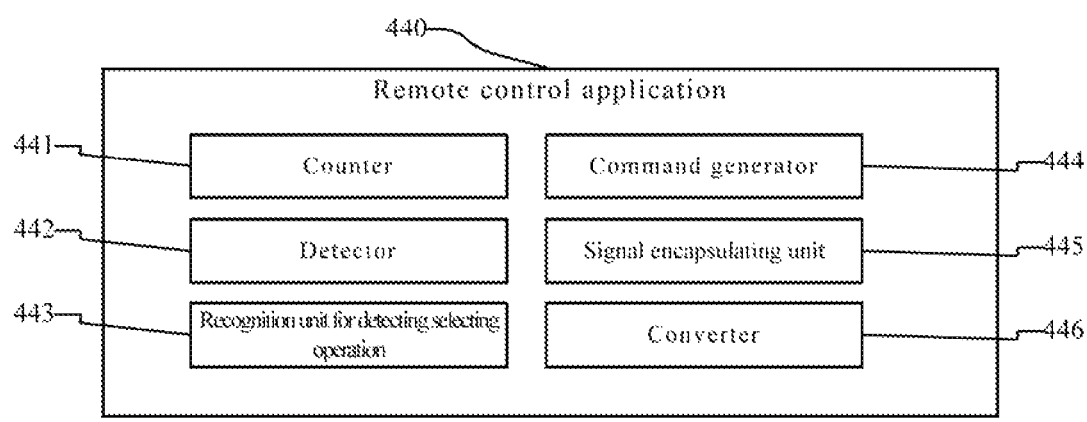
FIG. 1B is a schematic diagram of one embodiment of a remote control application.

FIG. 1B shows a schematic view of the remote control application 440. A detector 442 detects touch operations of the touch device 401. A touch operation comprises a user operation on a touch sensitive device such as the touch device 401 and the event is detected by the touch sensitive device. Various gestures applied to the touch sensitive device are detected by the touch sensitive device as different touch operations such as press-down, release, short press, long press, light press, heavy press, drag, move, swipe, and other operations/events. A short press on the touch device 401 with a net force greater than a net force threshold is referred to as a heavy press. A command generator 444 generates the consequences of a long press signal upon receiving a short press on the touch device 401 with a net force greater than a net force threshold. A signal encapsulating unit 445 encapsulates signals generated by the command generator 444 in a unit of data, such as a frame of a packet. The command generator 444 generates and transmits wireless touch signals of touch operation signals 90 associated with the touch device 401 through the signal encapsulating unit 445 and the wireless communication unit 402 to the media player device 50, to exert overall control of the media player device 50. The wireless touch signals represent net force measurements representative of touch operation signals 90 associated with the touch device 401. The remaining units and module in the remote control application 440 are detailed as follows.

A processor 51 in the media player device 50 is in communication with a memory 52, a display 53, an input device 501, and a wireless communication unit 502. Embodiments of the media player device 50 may comprise smart televisions or set-top boxes. FIG. 1 is provided for an example. An embodiment of the media player device 50 which comprises a set-top box may not comprise the display 43. Embodiments of the mobile device 40 may also comprise a media player device, such as a smart television.

The memory 52 in the media player device 50 may comprise an operating system and applications, such as Android™ operating system, an input service application 540 and a target application 550.

The processors 41 and 51 respectively constitute a central processing unit of the mobile device 40 and of the media player device 50, operable to process data and execute computer programs, and may be packaged as an integrated circuit (IC).

The wireless communication units 402 and 502 establish wireless communication channels to facilitate wireless communication between the mobile device 40 and the media player device 50 through the wireless communication channels, connection to an application store on the Internet, and downloading of applications, such as the remote control application 440 and the input service application 540, from the application store.

Each of the wireless communication units 402 and 502 may comprise antennas, base band and radio frequency (RF) chipsets for wireless local area network communications and/or cellular communications such as wideband code division multiple access (W-CDMA) and high speed downlink packet access (HSDPA).

Embodiments of the touch device may comprises capacitive, resistive, or infrared touch devices. The touch device detects touch operations and generates electrical touch operation signals based on the touch operations, and generates digital touch operation signals based on the electrical touch operation signals. The digital touch operation signals comprise a sequence of touch operation packets representative of the touch operations. Each packet within the touch operation packets comprises a pressure field, area field, and coordinate field respectively operable to store a pressure value, a pressed area, and coordinates representing a touch operation represented by the packet.

The touch device 401 may comprises a touch panel overlaid on a display, and may be integrated with the display 43 to be a touch display. The input device 501 may comprises functional control keys, alphanumeric keyboards, touch panels, and touch displays.

In the remote control application 440, the detector 442 detects user operations on the touch device 401. A counter 441 counts and signifies to the processor 41 a initiating time, a termination time, and duration of each of various user operations on the touch device 401. A selection recognition unit 443 determines whether a press on the touch device 401 is a heavy press to represent a long press. A long press comprises a press with an operation period greater than a time duration threshold, and a short press is a press with an operation period less than the time duration threshold. A heavy press is a press on the touch device 401 with a net force greater than a net force threshold. A value of net force of a touch operation on the touch device 401 is the product of a pressure value and a pressed area associated with the touch operation with respect to a point in time. The heavy press is recognized based on the net force threshold rather than on the time threshold, so a heavy press may be a short press.

A oscillator 44 provides clock signals to the processor 41 and other components in the mobile device 40. A oscillator 54 provides clock signals to the processor 51 and other components in the media player device 50. A controller 45 and/or a driver of the touch device 401 generates data packets of touch operations with respect to time with reference to clock signals provided by the oscillator 44 or the counter 441. Each packet within the touch operation data packets comprises a pressure value, a pressed area, and coordinates of a touch operation on the touch device 401 represented by the packet respectively stored in a pressure field, an area field, and a coordinate field of the packet.

The signal encapsulating unit 445 inputs as many touch operation packets of the sequence of touch operation packets as the duration of a certain time interval allows to a converter 446. The converter 446 generates a net force value of each input packet selected from these touch operation packets via the calculation of the product of a pressure value and a pressed area of the input packet, and thus generates net force values of the touch operation packets as a net force measurement of the touch operations, which may be rendered as a net force curve on a coordinates system.

In alternative embodiments, the converter 446 multiplies a pressure value and a pressed area associated with each input touch operation packet to obtain a product value for each input touch operation packet, and averages product values of a plurality of input touch operation packets over a specific period of time to obtain an averaged product value as a net force value of the input touch operation packet.

The signal encapsulating unit 445 or the converter 446 stores the net force of the input touch operation packet in the pressure field of the input touch operation packet to replace a pressure value in the pressure field. With reference to FIG. 2G, the specific period of time is illustrated as a time interval T1, and may be defined as a time interval smaller than T1, such as segment of time interval T1.

The processor 41 displays an object 71 on the display 43. The mobile device 40 comprises a target program which requires a long press to initiate selection of the object 71 and terminates the selection upon receiving a release event associated with the object 71. The target program of the mobile device 40 continues to receive coordinates of touch operations represented by touch operation signals 90 and may realize the commencement of a drag operation of the object 71 according to the received coordinates. Examples of the target program may comprises a target application 450 or an operating system. The target application 450 of the mobile device 40, for example, requires a long press to initiate selection of the object 71. The long press comprises a press with an operation period greater than a time duration threshold, and the mobile device 40 counts the period of operation from the onset of the long press to release or termination of the long press.

The processor 51 displays an object 72 on the display 53. The media player device 50 comprises a target program which requires a long press to initiate selection of the object 72 and terminates the selection upon receiving a release event associated with the object 72. The target program of the media player device 50 continues to receive coordinates of touch operations represented by touch operation signals 90 and may realize a drag operation of the object 72 according to the received coordinates. Examples of the target program may be a target application 550 or an operating system. The target application 550 of the media player device 50, for example, requires a long press to initiate selection of the object 72. The long press is a press with an operation period greater than a time duration threshold, and the media player device 50 counts the period of operation from the onset of the long press to release or termination of the long press.

Figure 2A:
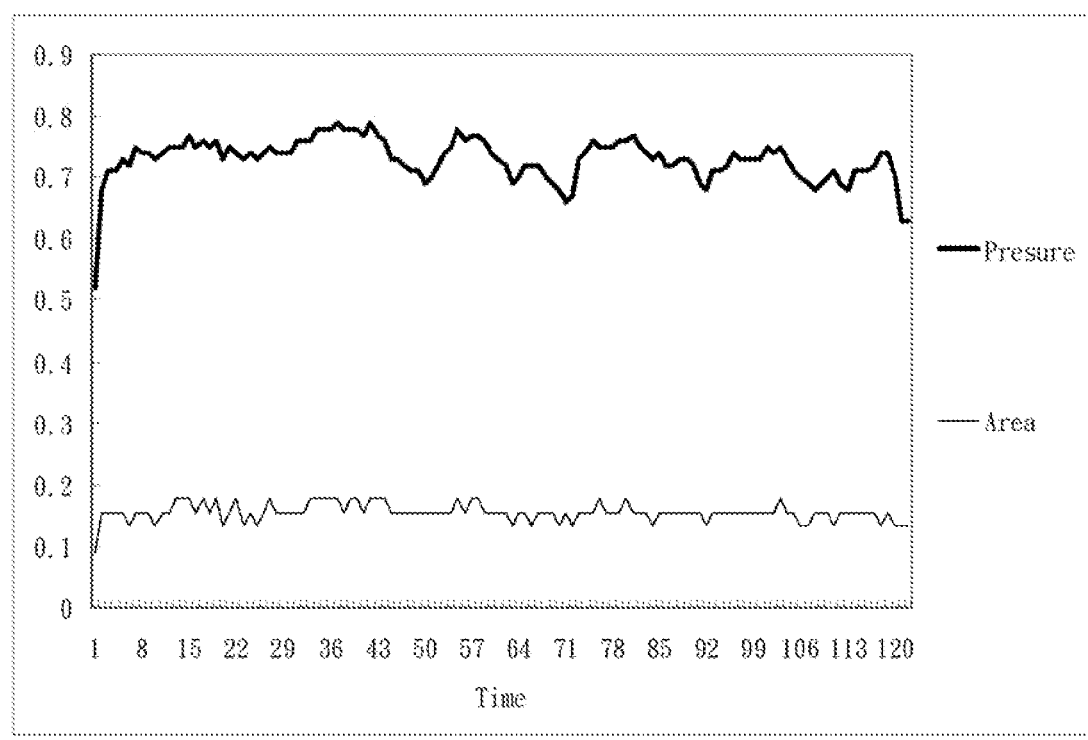
FIGS. 2A-2G are schematic diagram showing curves of pressure, curves of pressed area, and curves of net forces associated with touch operations.

FIG. 2A shows a curve of pressure 21 and a curve of pressed area 22 associated with the touch operation signals 90 received by the processor 41 from touch device 401. The touch operation signals 90 comprises a sequence of touch operation packets. The sequence of touch operation packets comprises a plurality of touch operation packets. A horizontal axis in FIGS. 2A-2G represents sequence numbers of packets receive by the processor 41 with respect to time, and a vertical axis in FIGS. 2A-2G represents values in the pressure fields and area field of the received packets. The curve of pressure 21 is obtained from pressure values of the touch operation packets stored in the pressure fields of the touch operation packets. The curve of pressed area 22 is obtained from pressed area of the touch operation packets stored in the area fields of the touch operation packets.

Figure 2B:
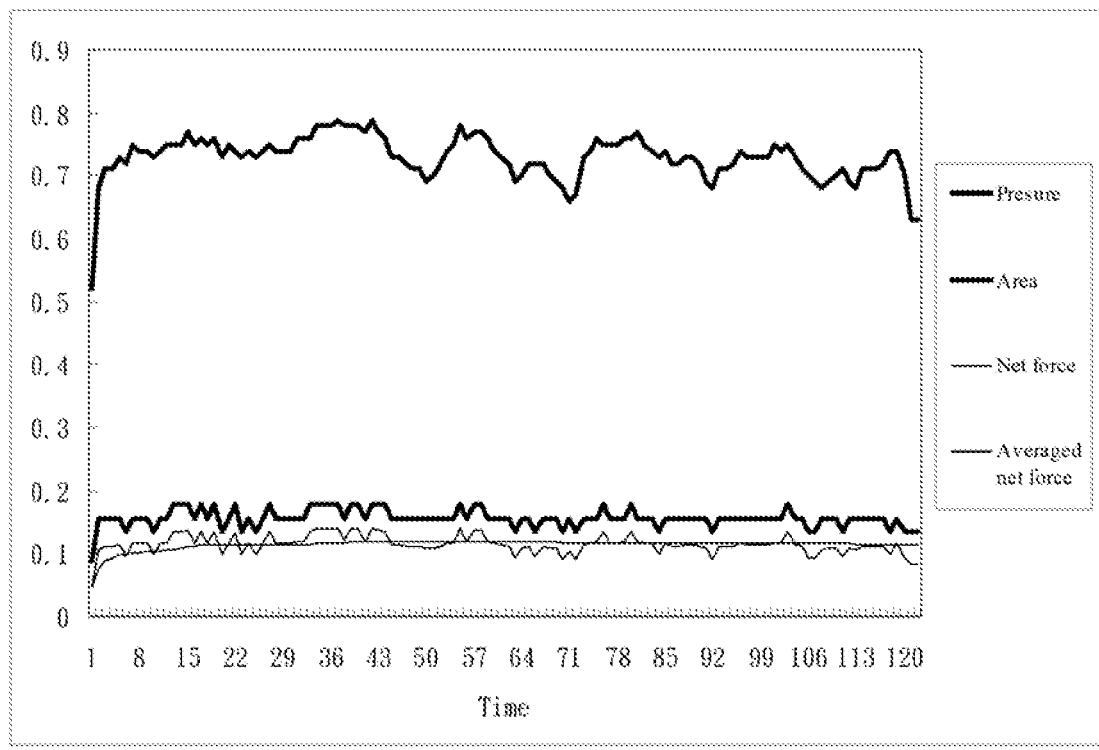
Figure 2C:
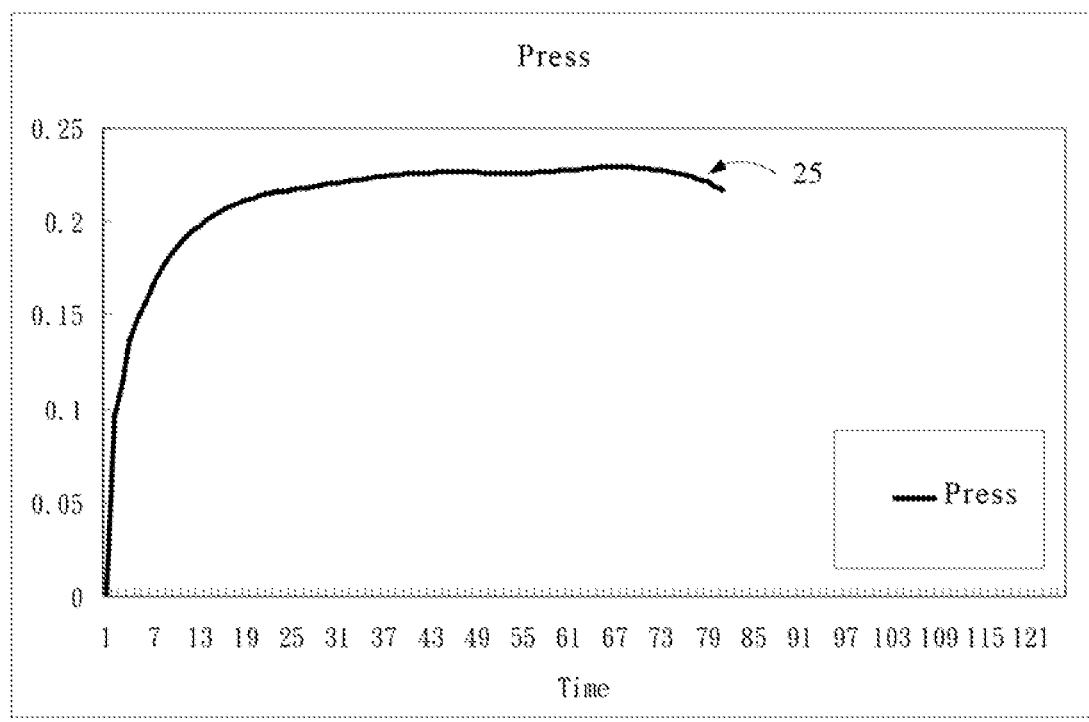
Figure 2D:
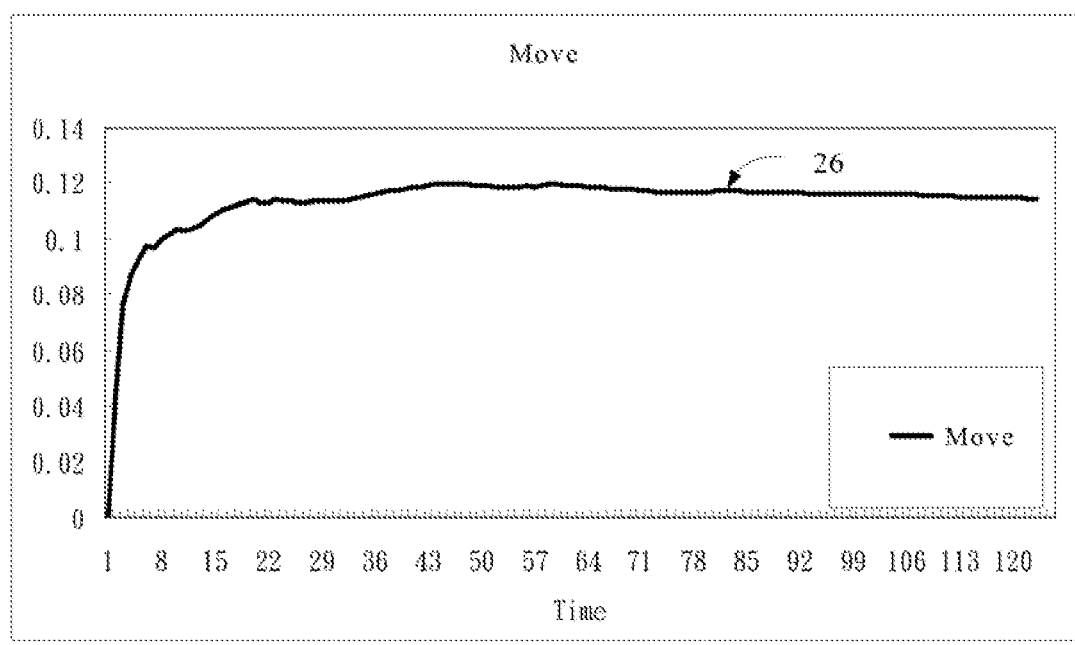
Figure 2E:
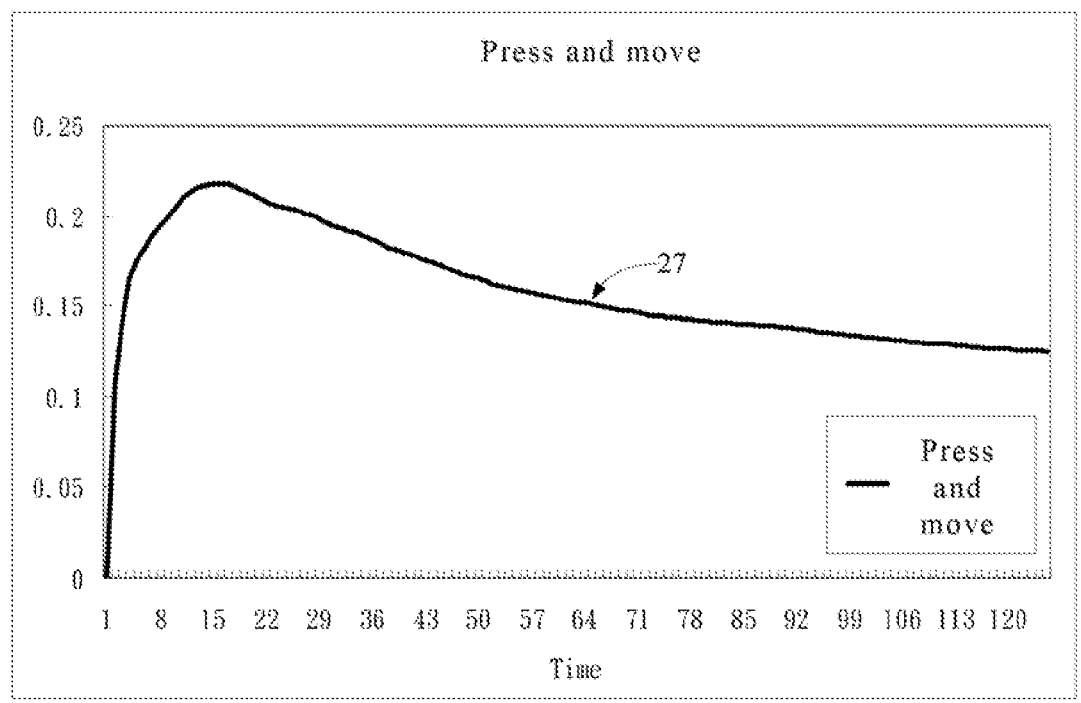
Figure 2F:
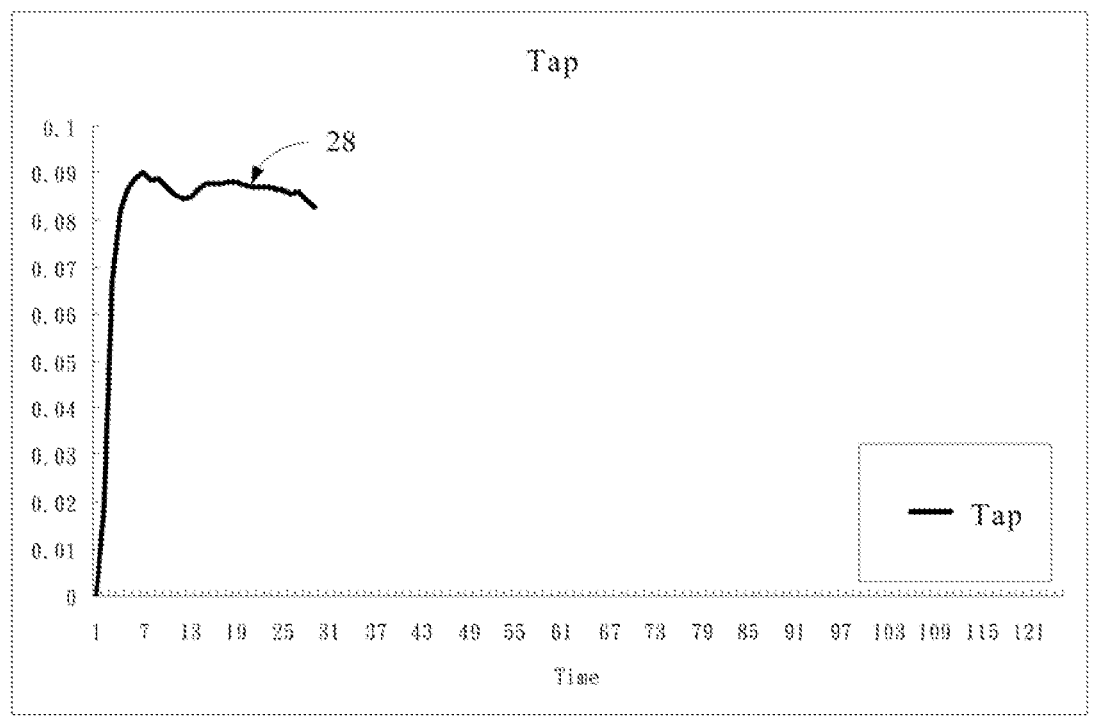
Figure 2G:
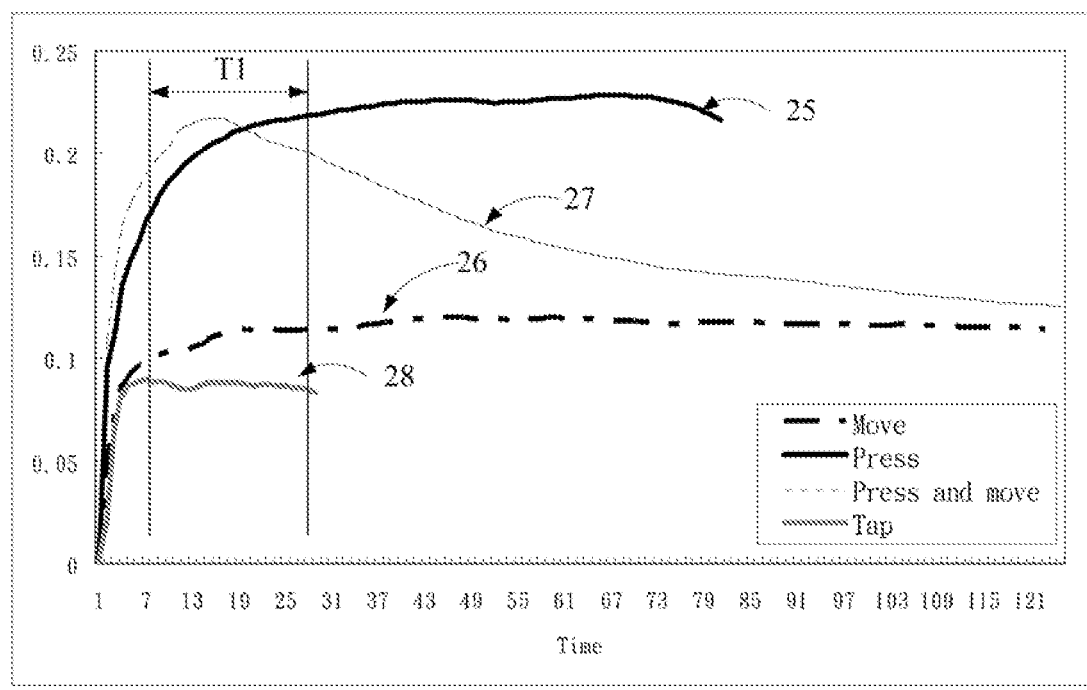

FIG. 2B shows curves of net force 23 and 24 associated with the touch operation signals 90 received by the processor 41 from touch device 401. The curves of net force 23 and 24 are obtained from net force values of the touch operation packets stored in the pressure field. The curve of net force 23 is obtained from a multiplication calculation. The curve of net force 24 is obtained from the multiplication and the averaging calculation.

FIGS. 2C, 2D, 2E, and 2F respectively show curves of net force 25, 26, 27, and 28 associated with the touch operation signals 90 received by the processor 41 from touch device 401. The curves of net force 25, 26, 27, and 28 represent different touch operations on the touch device 401. The curve of net force 25 represents a press down operation/event. The curve of net force 26 represents a touch movement operation/event. The curve of net force 27 represents a press and move operation/event. The press and move operation/event comprises a drag operation wherein a touch movement operation/event follows a press down operation/event. The curve of net force 28 represents a light press operation/event. A light press comprise a press operation with a net force less than a net force threshold. A heavy press comprise a press operation with a net force equal to or greater than a net force threshold.

FIG. 2G show a combined view of curves of net force 25, 26, 27, and 28 for convenience of comparison. A discernable difference exists between curves 25 and 27 representing at least a press down operation/event and curves 26 and 28 representing at least a light press operation/event. The selection recognition unit 443 may determine that curves 25 and 27 both represent a heavy press and that curves 26 and 28 do not represent a heavy press based on a net force threshold. The selection recognition unit 443 may interpret a portion of the curves 25 and 27 within time period T1 as being touch signals representing a heavy press which may be utilized to trigger selection of the object 71 or 72.

Figure 6:
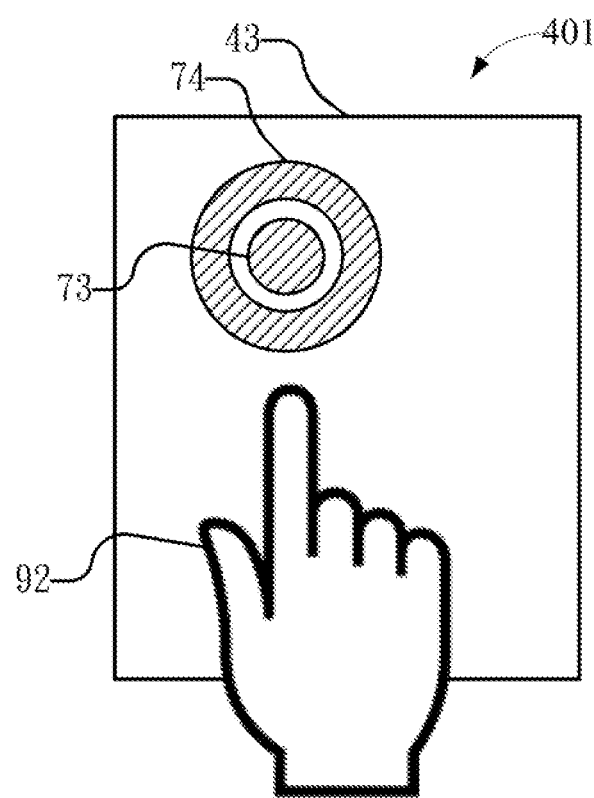
FIG. 6 is schematic diagram showing a framework indicating effectiveness of a heavy press.

As shown in FIG. 6, if a heavy press is applied to an object 73, a framework may be displayed to enclose the object 73 upon selection of the object 73, thus indicating the selection of the object 73, referred to as a first selection operation, during a period of first selection operation. The electronic system 10a may utilize various visual effects to indicate a heavy press on the object 73. Examples of the object 73 are the object 71 or 72.

The left end of each curve near the origin represents an onset point of a touch operation represented by the curve. An interval between the left end of each curve to the right limit of the time period T1 is smaller than the time threshold. In FIG. 2G, for example, time intervals between the origin to the left limit of the time period T1 and between the origin to the right limit of the time period T1 are substantially 0.1 seconds and 0.5 seconds respectively.

Figure 3:
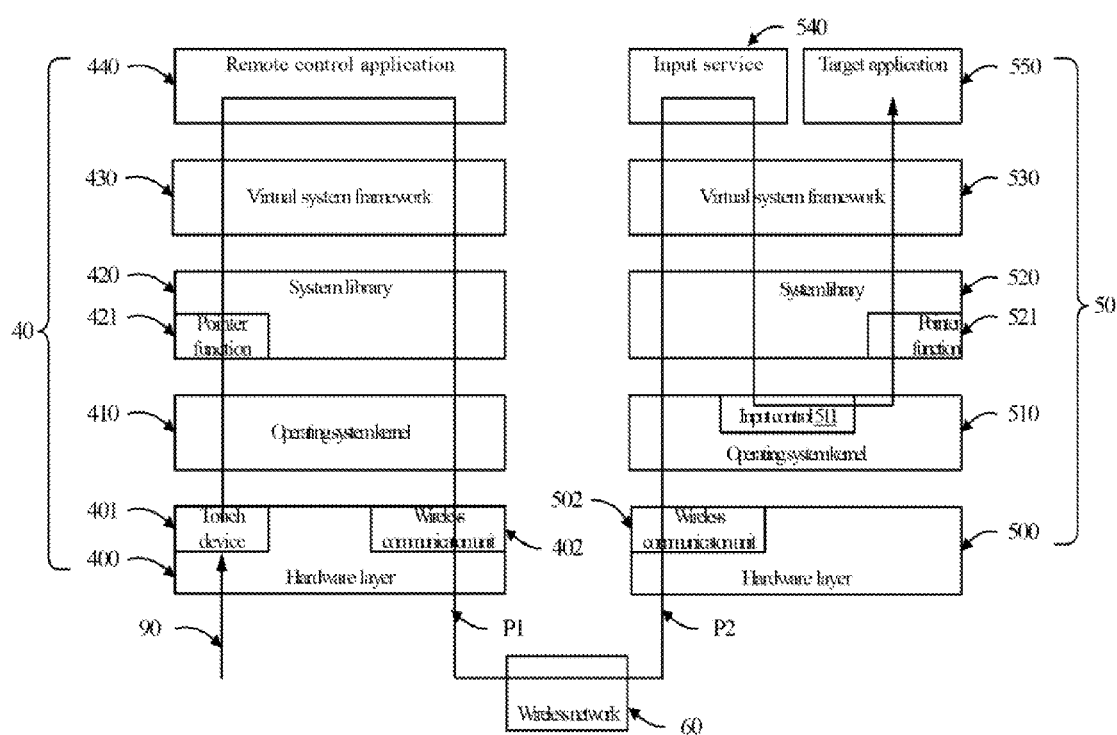
FIG. 3 is a schematic diagram showing software and hardware layers of a mobile device and a media player device.

With reference to FIG. 3, the mobile device 40 receives touch operation signals 90 via the touch device 401 of the hardware layer 400. The processor 41 of the mobile device 40 delivers and converts the touch operation signals 90 between the software and hardware units of the mobile device 40 in the sequence indicated by a path P1. The mobile device 40 then utilizes the wireless communication unit 402 of the hardware layer 400 to transmit the touch operation signals 90 to the media player device 50 through the wireless network 60.

The media player device 50 receives the touch operation signals 90 via the wireless communication unit 502 of the hardware layer 500. The processor 51 of the media player device 50 delivers the touch operation signals 90 between the software and hardware units of the media player device 50 in the sequence indicated by the path P2. The media player device 50 thus transmits the touch operation signals 90 to the target application 550 via a point function 521 in the system library 520. The target application 550 utilizes the touch operation signals 90 as the control signals to the object 72, or to a cursor, to perform a specific function.

Software and hardware units of the mobile device 40 include a hardware layer 400, an operating system kernel 410, a system library 420, a virtual system framework 430, and a remote control program 440. The system library 420 comprises a pointer function 421. The hardware layer 400 includes an touch device 401, a wireless communication unit 402, and other hardware components.

The operating system kernel 410 is Linux™ or other operating system kernel such as WINDOWS™, MAC OS™ or IOS™. The virtual system framework 430 may comprise an Android™ operating system or may comprise an instance of any other virtual machine. The wireless communication unit 402 is a wireless network device compatible with the Institute of Electrical and Electronics Engineers (IEEE) 802.11 standard or other wireless communication standard such as BLUETOOTH™ or ZIGBEE™.

The delivery and conversion of the touch operation signals 90 along the path P1 between the software and hardware units of the mobile device 40 (and then to the wireless network 60), as executed by the processor 41 of the mobile device 40, is shown in Table 1 as follows:

TABLE 1

| Sequence | Transmitting Unit | Receiving Unit |
|---|---|---|
| 1 | Touch device 401 | Operating System Kernel 410 |
| 2 | Operating System Kernel 410 | Pointer function 421 |
| 3 | Pointer function 421 | Virtual system framework 430 |
| 4 | Virtual system framework 430 | Remote Control Program 440 |
| 5 | Remote Control Program 440 | Virtual system framework 430 |
| 6 | Virtual system framework 430 | System Library 420 |
| 7 | System Library 420 | Operating System Kernel 410 |
| 8 | Operating System Kernel 410 | Wireless communication unit 402 |
| 9 | Wireless communication unit 402 | Wireless Network 60 |

Software and hardware units of the media player device 50 include a hardware layer 500, an operating system kernel 510, a system library 520, a virtual system framework 530, an input service 540, and a target application 550. The input service 540 is an application. The system library 520 comprises a pointer function 521. The operating system kernel 510 has an input control function 511. The hardware layer 500 further includes a wireless communication unit 502 and other hardware components of the media player device 50.

The operating system kernel 510 is LINUX™ or other operating system kernel such as WINDOWS™, MAC OS™ or IOS™. The virtual system framework 530 may comprise an ANDROID™ operating system or may comprise an instance of another virtual machine. The input control 511 may comprise a Uinput function of LINUX™. The wireless communication unit 502 and the wireless network 60 may respectively be a wireless network device and a wireless network compatible with the IEEE 802.11 standard or with another wireless communication standard such as BLUETOOTH™ or ZIGBEE™. The wireless network 60 may be one or more network devices which establish wireless network and communication channels.

The wireless communication unit 502 receives the touch operation signals 90 from the wireless network 60. The delivery and conversion of the touch operation signals 90 along the path P2 between the software and hardware units of the media player device 50, as executed by the processor 51 of the media player device 50, is shown in Table 2 as follows:

TABLE 2

| Sequence | Transmitting Unit | Receiving Unit |
|---|---|---|
| 1 | Wireless network 60 | Wireless communication unit 502 |
| 2 | Wireless communication unit 502 | Operating System Kernel 510 |
| 3 | Operating System Kernel 510 | System Library 520 |
| 4 | System Library 520 | Virtual system framework 530 |
| 5 | Virtual system framework 530 | Input service 540 |
| 6 | Input service 540 | Virtual system framework 530 |
| 7 | Virtual system framework 530 | System Library 520 |
| 8 | System Library 520 | Input control 511 |
| 9 | Input control 511 | Point function 521 |
| 10 | Point function 521 | Virtual system framework 530 |
| 11 | Virtual system framework 530 | Target Application 550 |

Touch operation signals received by the pointer function 421 are thus transferred and interpreted as touch operation signals dedicated to the pointer function 521, and are transferred to the target application 550 according to a connection or a relationship between the pointer function 521 and the target application 550. The connection or relationship may be based on function call or other control mechanism between the pointer function 521 and the target application 550. The target application 550 accordingly regards the touch operation signals 90 as user operation signals, such as pointer signals or others, to perform a function.

Figure 4:
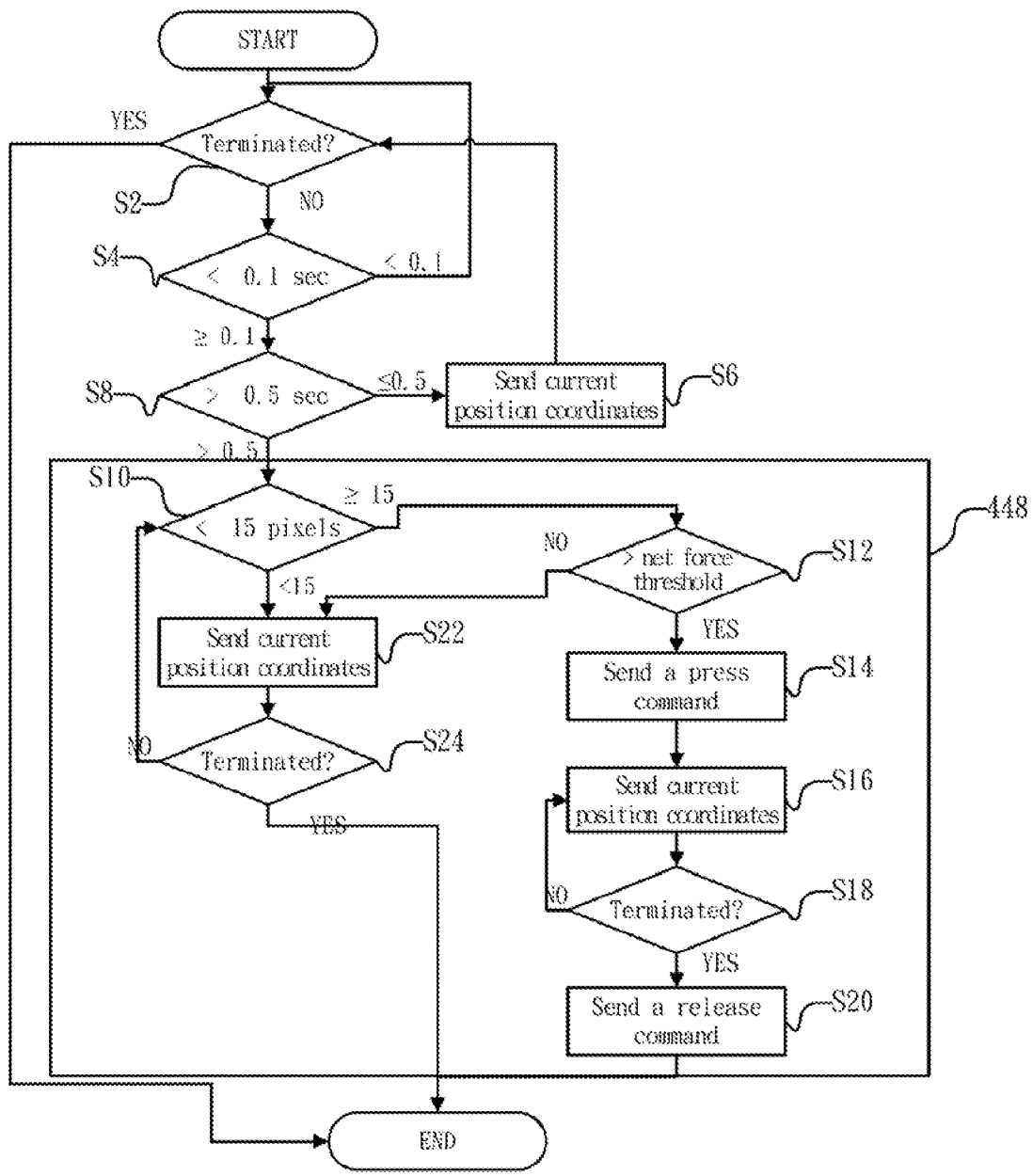
FIG. 4 is a flowchart showing a process of determination as to whether a selection or a dragging operation is initiated by touch operation signals.

FIG. 4 shows a processing flow of the touch operation signals 90 by the mobile device 40 and the media player device 50. One or both of the processors 41 and 51 may execute the steps in FIG. 4. One or both of remote control application 440 and the input service 540 may process the touch operation signals 90 according to the steps in FIG. 4.

A determination as to whether a touch operation conveyed by the touch operation signals 90 has been terminated is executed (step S2). If the touch operation has been terminated, the process of FIG. 4 is ended. If the touch operation has not been terminated, a determination is made as to whether the touch operation has endured for at least 0.1 seconds (step S4). If the touch operation has not lasted for at least 0.1 seconds, step S2 is repeated. If the touch operation has continued for at least 0.1 seconds, a determination is made as to whether the touch operation has lasted for at least 0.5 seconds (step S8). If the touch operation has not lasted for at least 0.5 seconds, touch operation packets comprising current coordinates of the touch operation are continuously delivered (step S6). If the touch operation has last for at least 0.5 seconds, a determination is executed as to whether the touch operation has spanned or moved across at least 15 pixels (step S10). If the span of the touch operation has not exceeded 15 pixels, touch operation packets comprising current coordinates of the touch operation are continuously delivered (step S22), and another determination as to whether a touch operation has been terminated is executed (step S24). If the span of the touch operation has exceeded 15 pixels, a determination is executed as to whether a net force measurement of the touch operation exceeds the net force threshold (step S12). If the net force measurement of the touch operation does not exceed the net force threshold, step 22 is repeated. If the net force measurement of the touch operation does exceed the net force threshold, signals signifying a press-down event/operation or a long press event/operation are delivered (step S14), and touch operation packets comprising current coordinates of the touch operation continue to be delivered (step S16). A further determination as to whether the touch operation has been terminated is executed (step S18). If the touch operation has not been terminated, step S16 is repeated. If the touch operation has been terminated, a release signal representing release of the touch operation action is delivered (step S20).

One or both of the processors 41 and 51 generate a first instance of the press-down signal or a long press signal to initiate selection of the object 71 or 72.

One or both of the processors 41 and 51 performs the following steps for recognition of a dragging operation: a drag recognition unit 448 is utilized to determine whether the measurement of the net force of the touch operation signals 90 is sufficient to trigger a first dragging operation of the object 71 or 72. One or both of the processors 41 and 51 utilize the drag recognition unit 448 to determine whether the touch operation signals 90 comprise a span or movement exceeding n pixels, wherein the number n is an integer. If the span of the touch operation exceeds n pixels, the first dragging operation of the object 71 or 72 is thus triggered following the first selection operation and is later terminated in response to termination of the first selection operation.

In an alternative embodiment of the electronic system 10a, the processor 41 display a graphical user interface to receive a heavy press on the touch device 401 and generates the net force threshold according to the heavy press.

Figure 5A:
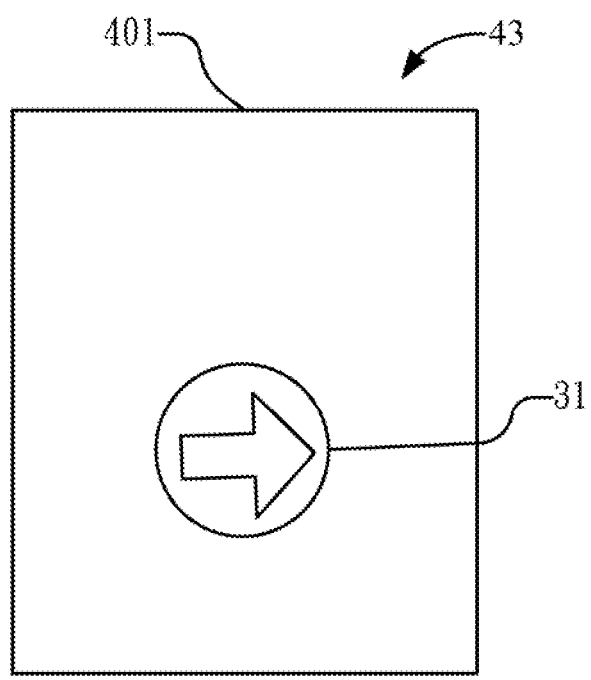
FIG. 5A is schematic diagram showing a greeting screen first displayed on a display, upon initialization of a remote control application.

FIG. 5A show a greeting screen first displayed on display 43 upon initialization of the remote control application 440. The greeting screen is a graphical user interface component 31 which requires a press-down event/operation to allow the remote control application 440 to take control. The remote control application 440 generates the net force threshold according to net force values of the touch operation signals of the press-down event/operation.

Figure 5B:
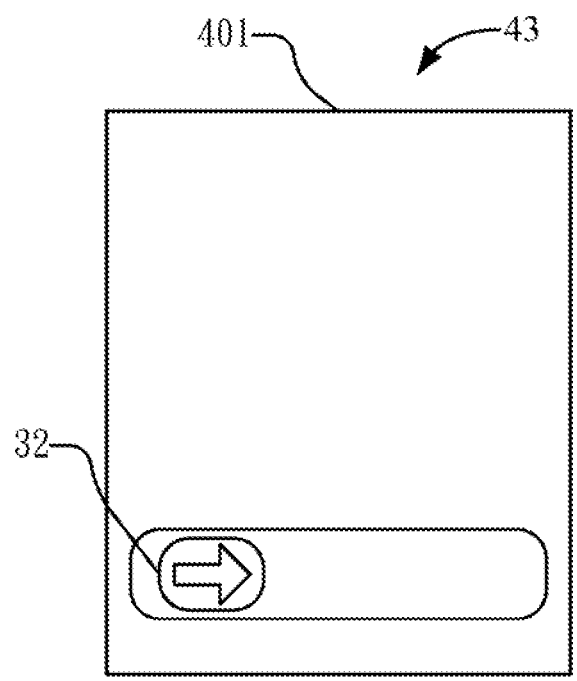
FIGS. 5B, 5C, and 5D are schematic diagrams showing show alternative screens displayed on a display in a locked mode of a mobile device.

FIG. 5B shows a screen displayed on display 43 in a locked mode of the mobile device 40. The screen comprises a graphical user interface component 32 which requires a dragging event/operation towards the right of the display 43 to unlock and wake up the mobile device 40 from the locked mode. The mobile device 40 may then receive normal touch operations. The remote control application 440 generates the net force threshold according to net force values of the touch operation signals of the dragging event/operation.

Figure 5C:
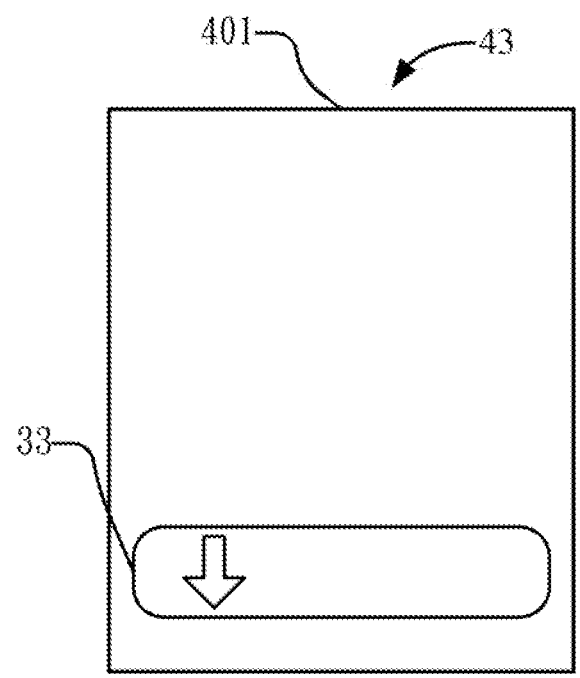

FIG. 5C show another screen which may be displayed on display 43 in the locked mode of the mobile device 40. The screen comprises a graphical user interface component 33 which requires a dragging event/operation downward towards the bottom of the display 43 to unlock and resume full service of the mobile device 40 from the locked mode. The mobile device 40 may then receive normal touch operations. The remote control application 440 generates the net force threshold according to net force values of the touch operation signals of the dragging event/operation downward.

Figure 5D:
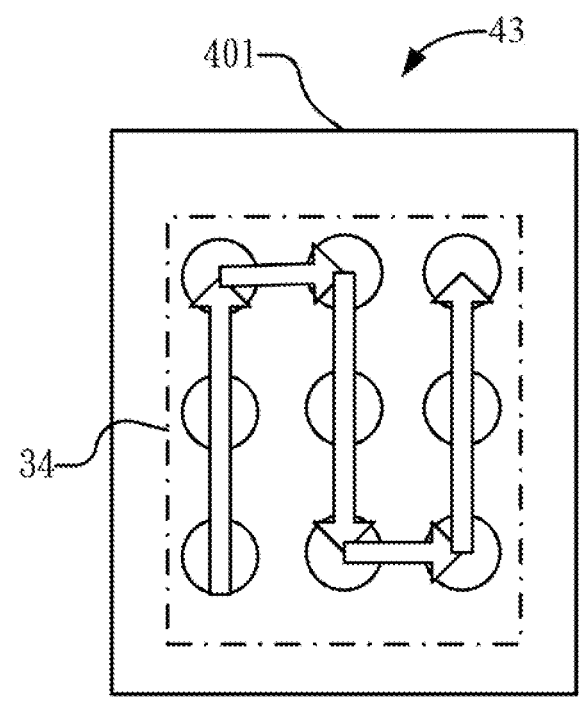

FIG. 5D show another screen which may be displayed on display 43 in the locked mode of the mobile device 40. The screen comprises a graphical user interface component 34 which requires a touch movement travelling in the correct order through circles in the component 34 to unlock and resume full service of the mobile device 40 from the locked mode. The mobile device 40 may receive touch operations in addition to the touch movement after exiting the locked mode. The remote control application 440 generates the net force threshold according to net force values of the touch operation signals.

Touch operation signals for the heavy press, press-down, and a long press event/operation may be generated in series or in parallel, or in a selective way. When the touch operation signals are generated in series, for example, the electronic system 10a generates signals of a long press operation/event according to signals of a heavy press operation/event, and generates signals of a press-down operation/event according to signals of a long press operation/event. When the touch operation signals are generated in parallel, for example, the electronic system 10a generates signals of a long press operation/event and signals of a press-down operation/event in parallel according to signals of a heavy press operation/event. When the touch operation signals are generated in a selective way, for example, the electronic system 10a generates signals of a long press operation/event or of a press-down operation/event according to signals of a heavy press operation/event.

The remote control application 440 may generate signals of a long press operation/event or of a press-down operation/event based on the touch operation signals 90 and transmit the generated signals to the target application 550. Alternatively, the remote control application 440 may generate and transmit the touch operation signals 90 to the target application 550, and the target application 550 in turn generates signals of a long press operation/event or of a press-down operation/event based on the touch operation signals 90.

The touch control method coexists with the long press operation/event to provide additional options in controlling an object. The touch control method generates signals of a long press operation/event according to signals of a heavy press operation/event, which allows simulation of a long press operation/event by a heavy press operation/event. The generated long press operation/event may be utilized to trigger subsequent operations, such as generating a press-down operation/event for selecting an object. The touch control method thus reduces the time required to trigger selection of an object.

The foregoing disclosure of various embodiments has been presented for purposes of illustration and description. It is not intended to be exhaustive or to limit the disclosure to the precise forms disclosed. Many variations and modifications of the embodiments described herein will be apparent to one of ordinary skill in the art in light of the above disclosure. The scope of the disclosure is to be defined only by the claims appended hereto and their equivalents.

What is claimed is:

1. A touch control method executable in an electronic system comprising a touch device and a processor, wherein the electronic system is operable to display an object and perform a selection of the object in response to a long press operation, the long press operation has an operation period counted from onset of the long press longer than a time threshold, and the touch control method comprising:
   detecting touch operations and generating electrical touch operation signals by the touch device representative of the touch operations;
   generating digital touch operation signals based on the electrical touch operation signals, wherein the digital touch operation signal comprises a sequence of touch operation packets representative of the touch operations, wherein each packet selected from the touch operation packets comprises a pressure field, area field, and coordinate field respectively operable to store a pressure value, a pressed area, and a coordinate of a touch operation represented by the packet;
   inputting a portion of the touch operation packets in the sequence during a time interval to a converter of the electronic system, wherein the converter generates a net force value of each input packet selected from the portion of the touch operation packets via a product calculation of a pressure value and a pressed area of the input packet, and thus to generate net force values of the portion of the touch operation packets as a net force measurement of the touch operations;
   utilizing a recognition unit to determine whether at least one net force record in the net force measurement exceeds a net force threshold;
   generating a first instance of a long press signal in response to the net force measurement upon a condition that at least one net force record in the net force measurement exceeds the net force threshold, wherein an instance of the long press signal is generated in response to an instance of the long press operation on the electronic system to represent the instance of the long press operation; and
   activating a selection of the object in response to the first instance of a long press signal.

2. The touch control method as claimed in claim 1, further comprising:
   generating and transmitting wireless signals representing the net force measurement to an external device to control the external device.

3. The touch control method as claimed in claim 2, wherein the electronic system comprises a smart mobile phone or a tablet computer.

4. The touch control method as claimed in claim 3, wherein the recognition unit is installed in the external device which comprises a smart mobile phone or a tablet computer.

5. The touch control method as claimed in claim 1, further comprising:
   storing by the converter the net force value of the input packet in the pressure field in substitution for the pressure value of the input packet.

6. The touch control method as claimed in claim 1, further comprising:
   utilizing the recognition unit to perform the following steps:
   sampling the net force measurement in respect of time to generate sampled net force measurement;
       determining whether at least one net force record in the sampled net force measurement exceeds the net force threshold;
       generating the first instance of the long press signal to initiate the selection of the object upon a condition that at least one net force record in the sampled net force measurement exceeds the net force threshold; and
       terminating the selection of the objection upon receiving an instance of a release operation of the electronic system.

7. The touch control method as claimed in claim 6, further comprising:
   displaying a first graphical user interface component operable to receive a heavy press on the touch device;
   generating the net force threshold value based on the heavy press.

8. The touch control method as claimed in claim 7, wherein the first graphical user interface component is operable to unlock a lock mode of the electronic system, and the touch control method further comprises:
  unlocking the lock mode of the electronic system when the first graphical user interface component receives a second drag touch operation.

9. The touch control method as claimed in claim 6, further comprising:
  displaying a framework to indicate the selection of the object for a period associated with the selection of the object.

10. The touch control method as claimed in claim 6, further comprising:
  utilizing a drag recognition unit to determine whether signals of the net force measurement triggers a first drag operation of the object;
  utilizing the drag recognition unit to determine whether the touch operations representative by the net force measurement comprises a touch movement on the touch device which exceeds n pixels, wherein the number n comprises an integer;
  initiating the first drag operation of the object upon a condition that the touch movement on the touch device which exceeds n pixels; and
  terminating the first drag operation of the object upon completion of the selection of the object.

11. The touch control method as claimed in claim 1, wherein the electronic system comprises a smart television or a set-top box.

12. An electronic system executing a touch control method, comprising:
  a media player device operable to display an object and perform a selection of the object in response to a long press operation, the long press operation has an operation period counted from onset of the long press longer than a time threshold;
  a mobile device comprising a touch device operable to detect touch operations and generate electrical touch operation signals representative of the touch operations, wherein the touch control method comprising:
    generating by the mobile device digital touch operation signals based on the electrical touch operation signals, wherein the digital touch operation signal comprises a sequence of touch operation packets representative of the touch operations, wherein each packet selected from the touch operation packets comprises a pressure field, area field, and coordinate field respectively operable to store a pressure value, a pressed area, and a coordinate of a touch operation represented by the packet;
    inputting by the mobile device a portion of the touch operation packets in the sequence during a time interval to a converter of the mobile device, wherein the converter generates a net force value of each input packet selected from the portion of the touch operation packets via a product calculation of a pressure value and a pressed area of the input packet, and thus to generate net force values of the portion of the touch operation packets as a net force measurement of the touch operations;
    generating and transmitting by the mobile device wireless signals representing the net force measurement to the media player device;
    utilizing by the media player device a recognition unit to determine whether at least one net force record in the net force measurement exceeds a net force threshold;
    generating by the media player device a first instance of a long press signal in response to the net force measurement upon a condition that at least one net force record in the net force measurement exceeds the net force threshold, wherein an instance of the long press signal is generated in response to an instance of the long press operation on the media player device to represent the instance of the long press operation; and
    activating a selection of the object in response to the first instance of a long press signal.

13. An electronic system operable to display an object and perform a selection of the object in response to a long press operation, the long press operation has an operation period counted from onset of the long press longer than a time threshold, comprising:
  a wireless communication device operable to execute a touch control method comprising:
    receiving from a mobile device digital touch operation signals, wherein the digital touch operation signal comprises a sequence of touch operation packets representative of touch operations on the mobile device, wherein each packet selected from the touch operation packets comprises a pressure field, area field, and coordinate field respectively operable to store a pressure value, a pressed area, and a coordinate of a touch operation represented by the packet;
    inputting a portion of the touch operation packets in the sequence during a time interval to a converter, wherein the converter generates a net force value of each input packet selected from the portion of the touch operation packets via a product calculation of a pressure value and a pressed area of the input packet, and thus to generate net force values of the portion of the touch operation packets as a net force measurement of the touch operations;
  a recognition unit operable to determine whether at least one net force record in the net force measurement exceeds a net force threshold;
  a command generator operable to generate a first instance of a long press signal in response to the net force measurement upon a condition that at least one net force record in the net force measurement exceeds the net force threshold, wherein an instance of the long press signal is generated in response to an instance of the long press operation on the electronic system to represent the instance of the long press operation; and
  activating a selection of the object in response to the first instance of a long press signal.

* * * * *